United States Patent [19]
Honomizo

[11] Patent Number: 5,532,691
[45] Date of Patent: Jul. 2, 1996

[54] KEYBOARD FOR PHOTOGRAPHIC PRINTING APPARATUS

[75] Inventor: Seiji Honomizo, Wakayama, Japan

[73] Assignee: Noritsu Koki Co., Ltd., Wakayama, Japan

[21] Appl. No.: 249,983

[22] Filed: May 27, 1994

[30] Foreign Application Priority Data

Jun. 7, 1993 [JP] Japan .................................... 5-030345

[51] Int. Cl.⁶ ................................................. H03M 11/00
[52] U.S. Cl. .............................. 341/22; 341/20; 345/168; 400/489; D14/115
[58] Field of Search .................................... 345/168, 169; 341/20, 21, 22, 23; 400/489; D14/115, 100; D18/7

[56] References Cited

U.S. PATENT DOCUMENTS 4,655,621  4/1987  Holden ........................................ 341/20
4,824,268  4/1989  Diernisse ............................. 364/709.12
5,059,048  10/1991  Sirkin ........................................ 400/489
5,087,918  2/1992  Guyot-Sionnest ....................... 345/169
5,281,966  1/1994  Walsh .......................................... 341/22

FOREIGN PATENT DOCUMENTS 8902369  3/1989  WIPO ......................................... 341/22

Primary Examiner—John K. Peng
Assistant Examiner—Daniel J. Wu
Attorney, Agent, or Firm—Wenderoth, Lind & Ponack

[57] ABSTRACT

A keyboard for a photographic printing apparatus includes a set of entry keys arranged on a board base for entering corresponding data to correct exposure and/or color tone. A primary group of the entry keys are linearly aligned at a home position, and the remaining keys are disposed along a path of fingers of the operator defined by inward and outward movements of the wrist of the operator about the home position, so that the entire arrangement of entry keys of the keyboard extend in an arc.

3 Claims, 3 Drawing Sheets

KEYBOARD FOR PHOTOGRAPHIC PRINTING APPARATUS

BACKGROUND OF THE INVENTION

The present invention relates to a keyboard comprising entry keys to perform exposure compensation and color correction for use in a photographic printing apparatus.

In a known photographic printing apparatus, an optimum of exposure for a desired picture frame of a color negative film is determined by measuring a total transmitted portion of irradiation of light falling on the negative frame. It is however difficult to make prints perfectly with 100% exposure because the frames vary from each other in the conditions of shooting and the type of object.

For compensation, each frame of the color negative film or its simulated image is viewed and examined by the operator of the photographic printing apparatus. More specifically the operator enters corrected values of exposure to a computer using entry keys of a keyboard to produce a print with an optimum result.

Such a keyboard associated with a conventional photographic printing apparatus comprises a set of entry keys 20 to 29 arranged linearly in a horizontal row on a board base A2 as shown in FIG. 2. Another keyboard shown in FIG. 3 has a set of entry keys 30 to 39 arranged in a matrix on a board base A3, similar to the arrangement of common ten keys.

The former arrangement is capable of accommodating a multiplicity of keys in a given space for the purpose of space saving. The disadvantage of such arrangement is that the lateral movement of a hand H of the operator in selecting desired entry keys is extensive to left and right as defined by the arrow in FIG. 2, thus causing the operator to stretch his or her arm A.

The latter key arrangement is not designed to ease the continuous action of operating the keys. In fact, the operator needs to move his or her arm A in zigzag or crosswise actions as show in FIG. 3.

As understood, the conventional keyboards for a photographic printing apparatus are rather low in controllability. Also, their home positions are not obvious, thus making it difficult for beginner operators to learn a blind-touch typing technique.

It is an object of the present invention to provide a keyboard for use in a photographic printing apparatus comprising a specific arrangement of entry keys which is operable without the need of an operator moving his or her arm and which offers ease of continuous typing.

SUMMARY OF THE INVENTION

A keyboard for use in a photographic printing apparatus according to the present invention comprises a set of entry keys arranged on a single board base for entering corresponding data to correct exposure and/or color tone. In particular, a primary group of the entry keys are linearly aligned at the home position and remaining keys are disposed along the path of fingers of the operator defined by inward and outward movements of the wrist of the operator about the home position so that the entire arrangement of entry keys of the keyboard extend in an arc.

As the entry keys on the keyboard of the present invention are arranged in an overall arc or curved line with some keys at the home position and the others along the path of the operator's fingers defined by the inward and outward movements of the operator's wrist about the home position, the keys can be hit without extensive movement and with a greater degree of continuity. Particularly, the keys off the home position can be accessed by the inward and outward turning of the wrist (or actions of radial and ulnar flexure).

The primary keys at the home position are linearly aligned in a substantially rectilinear alignment in the arc arrangement and will easily be distinguished from the other keys.

DETAILED DESCRIPTION OF THE PREFERRED EMBODIMENT

A keyboard A for use in a photographic printing apparatus has a plurality of entry keys N, 1,... arranged on a board base A1 for entering corresponding data to correct exposure and/or color tone. The entry keys N, 1,... are commonly operated by a left hand.

The center key designated by N (N standing for normal) on its hit surface is for zero correction.

The entry keys arranged on both sides of the center key N are denoted by 1 to 4 and 1A to 4A and carry on tops thereof discrete numerals +1 to +4 and −1 to −4, respectively, which represent magnitudes of correction.

As the entry keys for smaller increment and decrement (or absolute magnitude) are more frequently used, they are disposed with the smallest (absolute) next to the center key N.

The index finger, middle finger, and third finger are assigned to respective keys 1, N, and 1A at home positions thereof. No entry keys are operated by the thumb.

Figure 1:
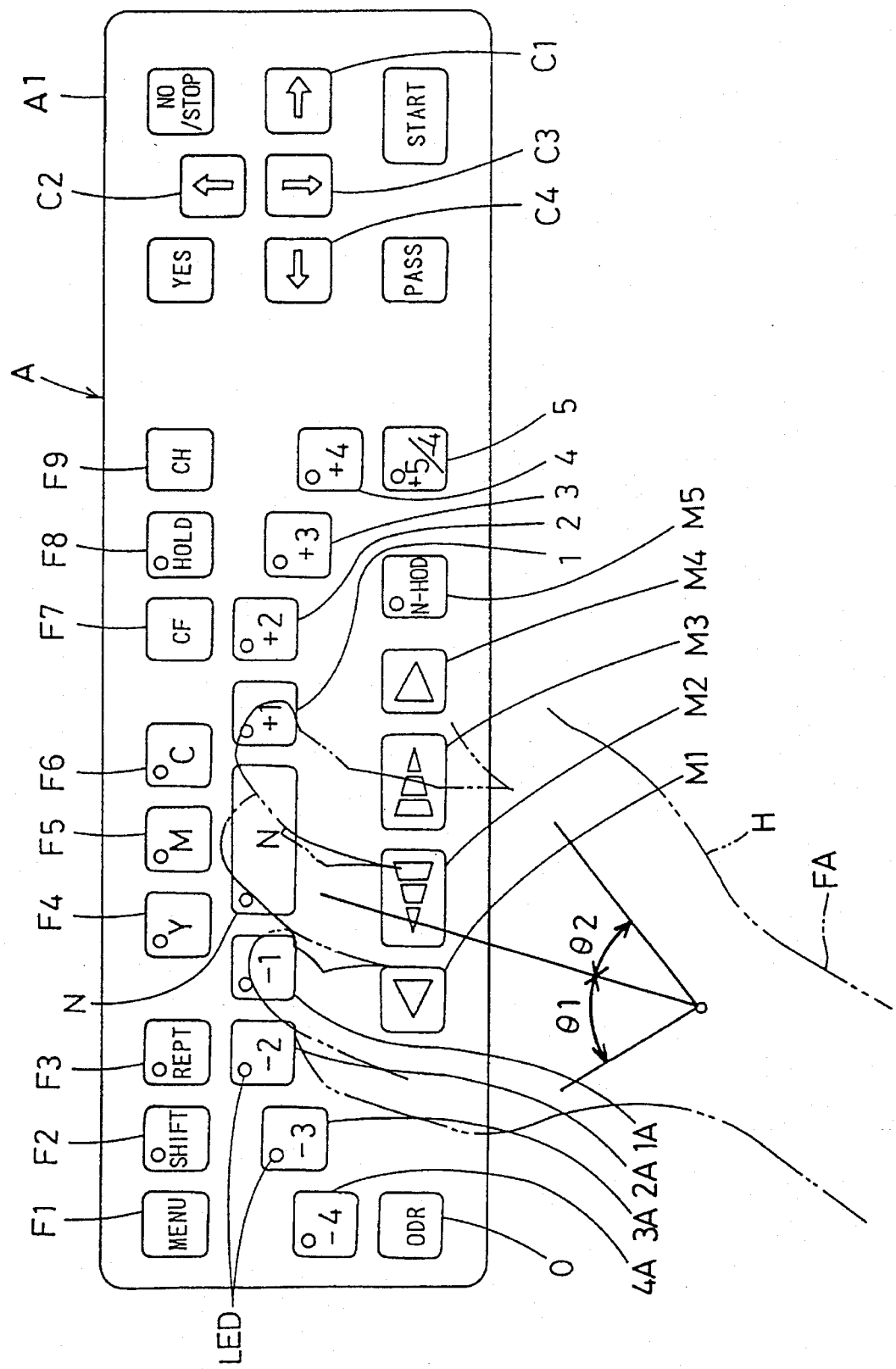
FIG. 1 is a plan view of a keyboard for use in a photographic printing apparatus showing an embodiment of the present invention.
Figure 2:
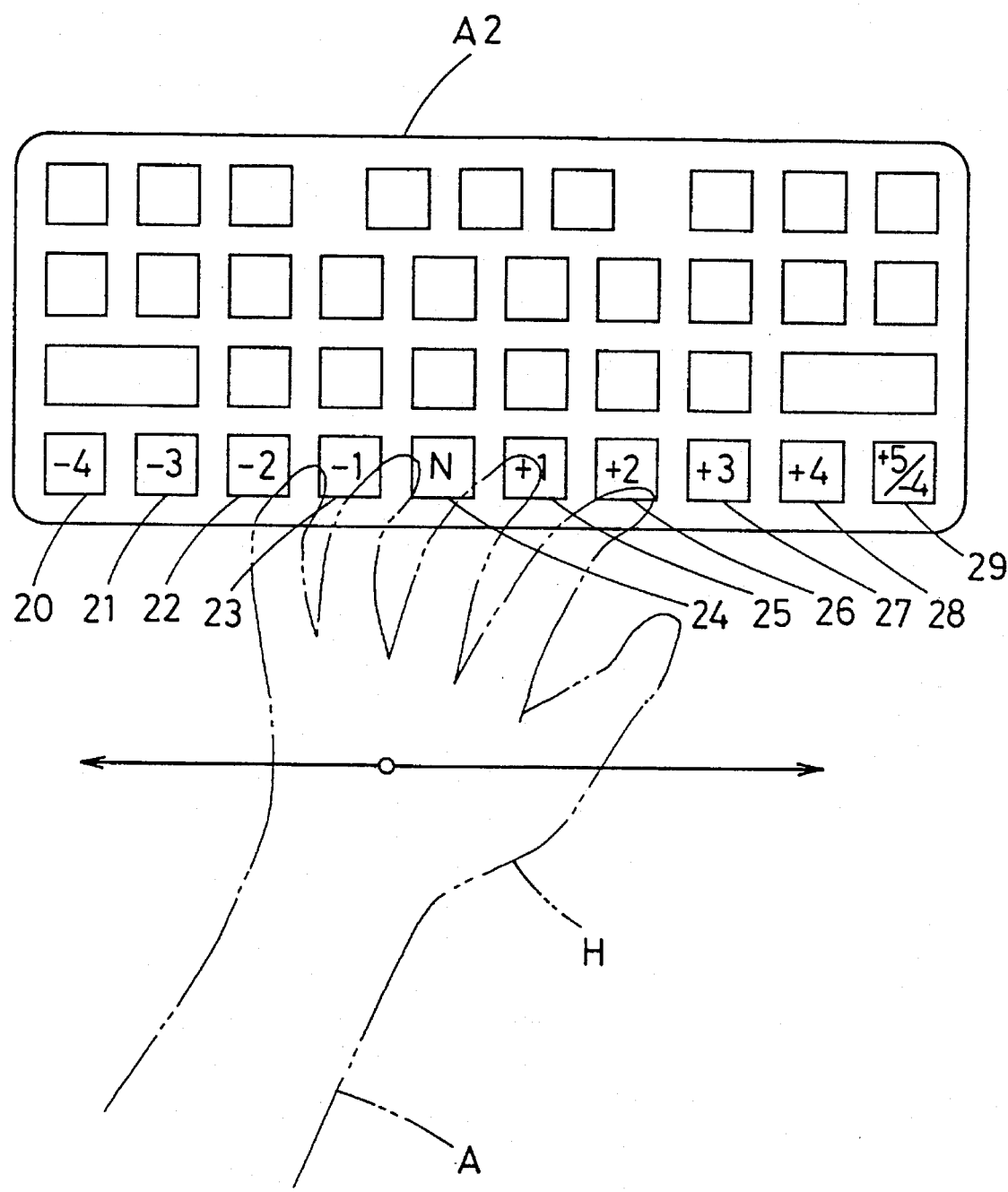
FIG. 2 is a plan view of a conventional keyboard in a photographic printing apparatus.
Figure 3:
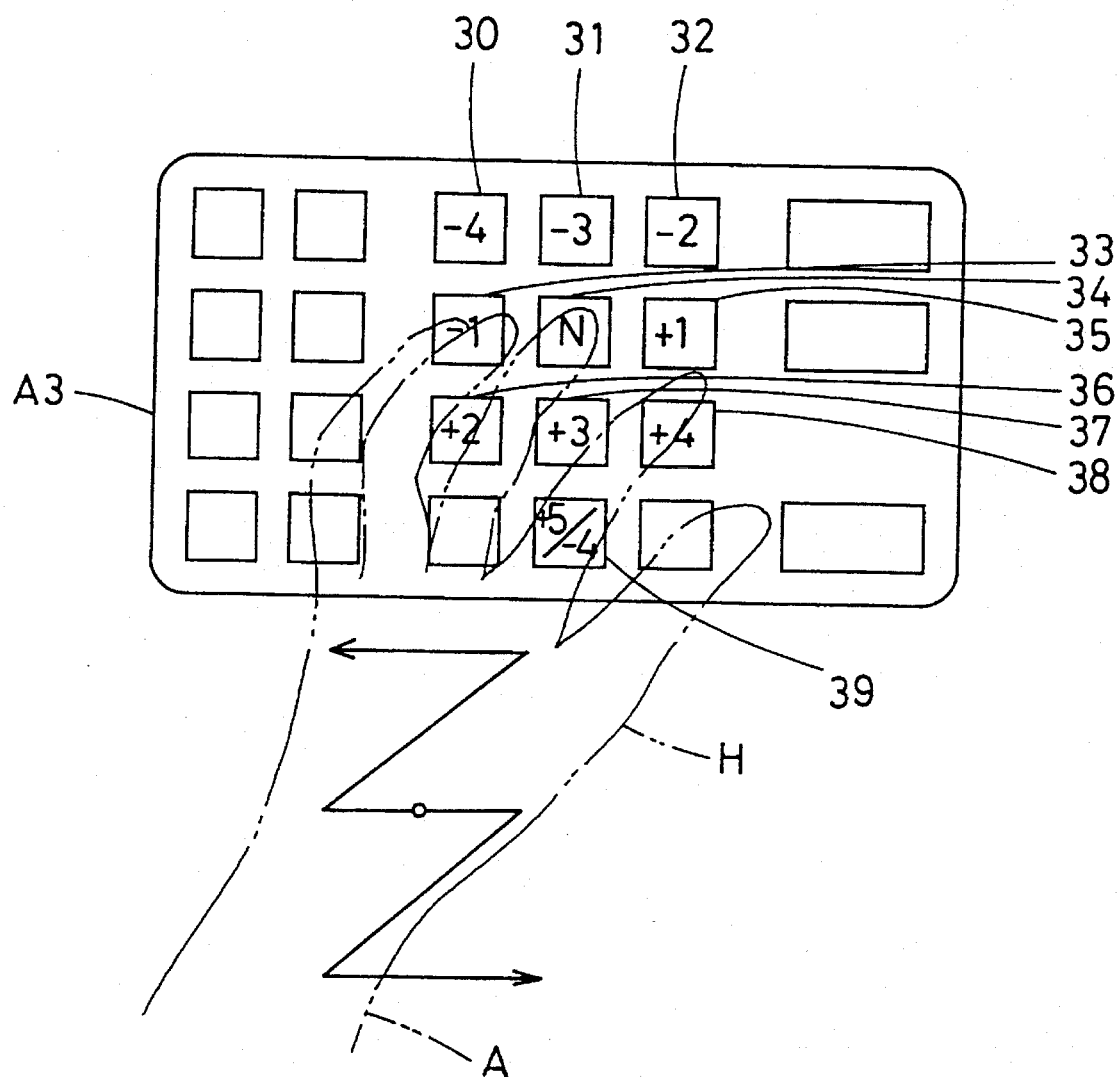
FIG. 3 is a plan view of another conventional keyboard in a photographic printing apparatus.

A key denoted by 5 in FIG. 1 carries a marking of −5/−4 which indicates for correction to +5 or more and −4 or less. For example, pressing the key 5 and then the +4 key results in correction to +9.

A key denoted by O is an order key carrying a marking of ODR. This key is for determining the order and is used for advancing each frame of a color negative film.

For control of exposure, a desired combination of the entry keys N, 1 to 5, and 1A to 4A are used to enter corresponding values. For compensation of color tone, one of function keys F4 to F6 (Y standing for yellow, M magenta, and C cyan) is first pressed for selection of a color and is followed by a combination of the entry keys N, 1 to 5, and 1A to 4A for entry of correcting data.

The entry keys other than 1, N, and 1A at the home position are arranged along a curved path of the fingers defined by the inward and outward turning of the operator's hand H about the home position, while the entire key arrangement N, −1, . . . is aligned in an arc. Thus, as illustrated, a primary group of the entry keys are arranged in a substantially rectilinear alignment. This primary group is indicated in the illustrated embodiment as comprising entry keys 1A, N, 1. Remaining of the entry keys are disposed at opposite ends of such substantially rectilinear alignment in respective curved alignments curving away from the substantially rectilinear alignment. This curvature occurs along respective paths of fingers, shown in dashed lines, of an operator defined by inward and outward movements of the wrist of the operator. As a result, the overall arrangement of all of the entry keys is an arc, for example that would be defined by a curved line connecting the centers of each of the entry keys illustrated. Each curved alignment of entry keys at each respective opposite end of the substantially rectilinear alignment is curved away from such substantially rectilinear alignment at increasing rates of curvature at increasing distances from such respective opposite end. In other words, it will be apparent from a consideration of FIG. 1, that the increment of curvature, relative to the substantially rectilinear alignment, between keys 5 and 4 is substantially greater than that between keys 4 and 3, and that the increment between keys 3 and 2 is substantially greater than the increment between keys 2 and 1. This is true for the curved alignments at each end of the substantially rectilinear alignment. As a result, each curved alignment is defined by a non-circular arc, which generally is spiral shaped. Each curved alignment is a mirror image of the other curved alignment.

Each entry key is equipped with a light emitted diode (LED).

When the operator's hand H rests on the keyboard A, his or her wrist FA remains turned inwardly as shown in FIG. 1.

The operator's hand H is turnable outwardly through θ1 or 45 degrees and inwardly through θ2 or 25 degrees. As understood, θ1 is greater than θ2.

This allows the operator's hand H remaining turned inwardly to access with ease the outside keys 1A, 2A, 3A, and 4A, and the order key 0.

The arrangement of the entry keys is not strictly limited to the path of the fingers defined by the inward and outward movements of the operator's hand H and may be modified or changed within a range accessible by reaching out and bending the fingers to satisfy particular design requirements.

There are a set of control keys M1 to M5 provided inside of (or beneath) the arc arrangement of the entry keys N, 1, . . . for automatic negative film masking control (not shown), while function keys F1 to F9 are arranged outside of (or above) the entry keys, so that space of the board base A1 is saved for optimum controls.

The function keys F1 to F9 are marked on the hitting surfaces thereof as shown in FIG. 1.

Also, provided are cursor keys C1 to C4 which are commonly operated by this right hand of the operator.

Although, in the embodiment, the distance between any two adjacent entry keys is 1.7 to 1.9 cm, the hitting force is 0.4 to 0.8 N, the pressing stroke is 0.3 to 0.5 cm, and the board base A1 is tilted at an angle of 5 to 15 degrees, design variations of such parameters also will be possible.

What is claimed is:

1. A keyboard for a photographic printing apparatus, said keyboard comprising:

a single board base;

a set of entry keys arranged on said single board base for entering corresponding data to correct exposure or color tone;

a primary group of said entry keys being arranged in a substantially rectilinear alignment at a home position;

remaining of said entry keys being disposed at opposite ends of said substantially rectilinear alignment in respective curved alignments curving away from said substantially rectilinear alignment along paths of fingers of an operator defined by inward and outward movements of a wrist of the operator about said home position, whereby the overall arrangement of said primary group and said remaining of said entry keys is an arc;

each said curved alignment being a mirror image of the other said curved alignment;

each said curved alignment at each respective said opposite end of said substantially rectilinear alignment being curved away from said substantially rectilinear alignment at increasing rates of curvature at increasing distances from said respective opposite end; and a plurality of control keys arranged on said single board base at a location within the curvature of said arc of said overall arrangement of said entry keys.

2. A keyboard as claimed in claim 1, wherein said entry keys are representative of data weighted to increase incrementally in absolute value in opposite directions from a lowest absolute value at a center entry key of said primary group of entry keys.

3. A keyboard as claimed in claim 1, wherein each said curved alignment is defined by a non-circular, generally spiral arc.

* * * * *